United States Patent [19]
Barbier

[11] Patent Number: 5,103,648
[45] Date of Patent: Apr. 14, 1992

[54] OIL LEVEL CONTROL SYSTEM

[75] Inventor: William J. Barbier, Hazelwood, Mo.

[73] Assignee: AC&R Components, Inc., Chatham, Ill.

[21] Appl. No.: 530,895

[22] Filed: May 29, 1990

[51] Int. Cl.⁵ .................. F25B 31/00; G01F 23/00
[52] U.S. Cl. ........................... 62/126; 62/193; 73/293; 73/327
[58] Field of Search .......... 73/327, 293; 62/193, 62/126; 137/386

[56] References Cited

U.S. PATENT DOCUMENTS

| | | | |
|---|---|---|---|
| 3,461,907 | 8/1969 | Wood, Jr. | 137/386 |
| 3,727,242 | 4/1973 | Miller | 73/327 |
| 3,882,887 | 5/1975 | Rekai | 137/386 |
| 4,090,371 | 5/1978 | Keane | 62/193 X |
| 4,428,208 | 1/1984 | Krause | 137/440 X |
| 4,857,894 | 8/1989 | Dahl | 73/293 X |

FOREIGN PATENT DOCUMENTS 1553642 10/1979 United Kingdom .......... 73/293

*Primary Examiner*—William E. Wayner
*Attorney, Agent, or Firm*—Haverstock, Garrett and Roberts

[57] ABSTRACT

An oil level sensor device for sensing and controlling the level of oil in the crankcases of refrigeration compressors, each compressor having a crankcase with a housing for oil that accumulates during the compression operation and each housing having an opening with a prism member mounted in it, the prism members having two angularly relating surfaces exposed to the oil in the crankcase and a light source and a light sensor mounted adjacent to the prism on the outside of the crankcase housing such that the light from each light source impinges on one of the angularly related prism surfaces and is reflected thereby to the second angularly related surface and then back to the light sensor. Each light sensor has an output which is connected to the input of the control circuit which operates to energize a solenoid valve to add oil to the crankcase from a remote source when the oil level in the crankcase as sensed is below a predetermined level. The subject oil level sensor device may include a plurality of vertically arranged light sources and light sensors and the circuit may optionally include a circuit portion responsive to an over filled and an underfilled condition to produce an alarm. The circuit also includes an adjustment device which can be set to establish and maintain any desired oil level in the crankcase.

28 Claims, 7 Drawing Sheets

OIL LEVEL CONTROL SYSTEM

The present invention relates generally to fluid level control systems and more particularly to several embodiments of an oil level control system having sensor means mounted on the crankcase of refrigeration compressors or like devices. The present oil control system provides means for accurately monitoring and maintaining the level of oil in the respective compressor crankcases at a desired level without being affected by changes in compressor usage, pressure differentials, normal or unusual oil loss, or the presence of foam on the crankcase oil. The present device may also be used to limit the amount of oil in the crankcase or to maintain the oil depth within some pre-established range. The present oil level control system is especially adapted for use with commercial and industrial refrigeration systems and for independently controlling the oil level of each individual compressor in a system including two or more compressors that share a common refrigerant piping network and a common source of compressor oil. The present level control system may have several different embodiments of optical oil level sensing means for mounting on a compressor crankcase in position to monitor the oil level therein and the system preferably includes solenoid valve means located between a source or sources of oil and the individual crankcases, which valve means are energizable by the sensing means to supply oil to the respective crankcases when the level of oil falls below some predetermined oil level. Optionally, the present oil level control system may include means for cycling the valve means on and off so that any foam that is produced does not affect the oil level being sensed and the system may include alarm means for signaling an operator when particular conditions exist such as an over or under supply of oil in a crankcase.

There are numerous means in existence for controlling the oil level in compressor crankcases, the most widely known using float operated devices. Typical of such devices are those that include a float member which moves with the changing level of the oil to mechanically reposition valve means relative to a valve seat to control the introduction of oil into the crankcase, see for example the construction shown in Krause U.S. Pat. No. 4,428,208. Float operated valves are not able to accurately control and maintain a consistent oil level under the various operating conditions discussed above and they are subject to other factors that affect their accuracy.

One of the conditions that affects the operation and accuracy of float operated valves are fluctuations in the pressure differential across the valve seat. This is an important limitation of such devices because changes in the pressure differential produces force changes on the valve seating means which must be counterbalanced by a change in the immersion level of the float ball with a resulting change in level control point of the valve, and may necessitate changing or adjusting valve parameters from time to time such as the immersion level of the float member. Changing parameters such as the float level require skill and experience to evaluate, and improper adjustment can result in over or under filling the crankcase with resulting problems. Another condition which may cause similar problems for float operated valves is a fluctuation in the rate of oil loss from the crankcase due to some of the same factors which affect crankcase pressure.

Changes in the rate of oil pumped by the compressor will change the required oil flow area and the associated height of the float valve seating mechanism. This condition will change the level controlled by the float ball and may necessitate changing valve parameters such as the immersion level of the float member to correct the crankcase oil level.

Another problem frequently encountered with float operated valves is the tendency to leak during periods of non-use which can result in the crankcase overfilling with oil. Leakage may occur for a number of reasons. One such reason is that such valves are normally maintained in their closed position by forces that are only slightly greater than the forces that open the valves which means that the closing forces may be insufficient to keep the valve tightly closed resulting in some leakage. This problem may be aggravated where frictional forces between the valve components act against the closing forces. Also adversely affecting the operation of float valves is a foaming condition that occurs on the surface of the crankcase oil due to evaporation of refrigerant out of the oil returned to the low pressure crankcase from the high pressure refrigerant piping network. Foaming can cause a change in the level control point if the foam is sufficiently dense and it can cause the float to be suspended above the surface of the oil resulting in a lower than desired oil level. Foaming not only affects mechanical float valves, but also other level control devices that use a floating member to actuate means such as a switch that controls a solenoid or other valve means. Furthermore, because foam changes the characteristics of the oil surface, some level control systems having optical level sensing means such as photoelectric cells or the like which operate in a way to distinguish between the liquid surface and the gas above, can be affected by a foaming condition. Typically, such devices will incorrectly interpret the foam to be oil and allow the actual oil level to fall below the desired level.

SUMMARY OF THE INVENTION

The present oil level control system overcomes many of the shortcomings and limitations associated with known constructions and teaches the construction and operation of several embodiments of a system which more accurately and precisely monitors and adjusts the level of oil in a compressor crankcase during both normal operating conditions, and when subjected to adverse conditions such as changes in pressure, oil loss rate and the presence of foam on the oil surface. The present device also provides more positive open and closed conditions to more accurately control the flow of oil to the compressor, and which thereafter is less likely to leak during periods of non-use. The present oil level control system can be used to control the oil level in a single compressor system as well as to control the oil level in the individual compressors in a multi-compressor system wherein the oil level in the individual compressors is independently controlled while drawing fresh oil from a common source or reservoir.

For more accurate and precise monitoring of oil level, the present system includes optical oil level sensing means, several embodiments of which are disclosed. These devices are relatively unaffected by changing pressure differential, oil loss rate and oil density and they are relatively unaffected by foaming. When in use, the present optical level sensing means generally require no adjustment other than the initial adjustment to establish the desired oil level. The present systems are especially well suited to use with solenoid valves which have positive open and closed conditions and relatively constant operating characteristics even under changing system conditions. Solenoid valves, unlike the more conventional float valves, are also much less prone to leakage. The present system also includes circuit means for energizing and deenergizing the solenoid valve in response to changes in the output of the optical level sensing means, and the present system is adaptable to use in multi-compressor systems where the oil level in each different compressor in the system is individually monitored and controlled. Such systems are often found in refrigeration and air conditioning systems where a plurality of compressors, each operating independently of the others, are used.

The optical oil level sensing means included in the present system include a prism sightglass, one of which is mounted in the crankcase wall of each compressor in the system and operates in conjunction with an optical coupler including a light source and light sensor sometimes referred to as a detector or transducer. Each prism has two angularly related prism surfaces which are vertically oriented and exposed to the oil in the compressor crankcase so that the oil surface will be adjacent to the prism surfaces over the range of oil levels to be monitored and controlled. Several embodiments of optical couplers are disclosed in which either one or several optical couplers are provided. each including one or more light sources and one or more sensor, detector, or transducer. The optical couplers can be used to control oil level, to detect a range of oil levels and to detect critical high and critical low oil levels and to produce an alarm when either such condition is sensed. The prism sightglass isolates the optical coupler components from the crankcase oil and hence they are not exposed to or affected by changes in oil pressure, oil density and other conditions that exist inside the crankcase.

The light source for each optical coupler produces a beam of light which is directed at the prism through the sightglass and impinges a spot on one of the angularly related faces that is exposed to the oil. The amount of this light that is reflected by the surface depends on the condition in the crankcase behind the surface, more of the light being reflected if the oil level is below the level where the light impinges. The light that is reflected impinges as a spot on the other angularly related prism surface and is reflected by that surface through the sighted glass or prism, sometimes also called an optical window, again depending on the condition in the crankcase behind that spot. Whether light reaches the sensor therefore depends on the level of the oil. Each light sensor or detector generates or does not generate an output signal depending upon whether or not light is received from its associated light source. The nature of the signal produced by a transducer is representative of whether the oil level is above or below the level of that light coupler.

Due to the internal reflective nature of a prism which reflects the cone shaped beam of light from the light source in all directions, it is typical, in optical couplers with more than one light sensor or detector, to use fewer light sources than the number of light detectors. The oil level is determined by the highest light detector which receives reflected light.

Several embodiments of optical coupler arrangements are shown and described including constructions having a single optical coupler at a fixed location which can be vertically adjustable. Two vertically spaced optical couplers can be used to establish a range of acceptable oil level and still more can be used to establish a desired level or range of levels and to produce alarms when the oil level rises too high or falls too low. In the various multi-coupler embodiments all of the optical couplers are arranged vertically. No known oil level control system has the capability of as accurately and precisely monitoring oil level or range of oil level and none does so in a system that may include any number of compressors.

As indicated above, optical couplers may be affected by the presence of foam on the oil surface in the crankcase as a result of evaporation of refrigerant or for other reasons. To overcome this problem the present system may include means to cycle the solenoid valves between their open and closed conditions to dissipate the foam for more accurate sensing of the actual oil level. During valve open times of the cycling, the valve stays open for a minimum time period to prevent foam from terminating oil flow to the crankcase. No existing oil level control system has such a feature. During valve closed times of the cycling the foam dissipates allowing the optical coupler to obtain accurate oil level indications. The solenoid valves can then be controlled as needed to accurately and precisely add oil to maintain the desired oil level.

The present system has a separate independently controllable solenoid valve to control the introduction of oil into the crankcase of each compressor. The valves are electrically energized and are not affected by fluctuating pressure or pressure differentials or by changes in oil level or surface density due to foaming conditions and the like. The crankcase conditions do not affect the valve means used because the valves are positively fully open or fully closed and the force maintaining the valve in the open and closed conditions is not dependent on or affected by any of the above factors.

It is a principal object of the present invention to provide an improved fluid level control system to accurately and precisely control the level of oil in a compressor crankcase, and one which is not substantially affected by fluid loss rates, pressure changes or by conditions such as the formation of foam on the surface of the fluid in the crankcase.

Another object is to provide an oil level control system which accurately and precisely maintains the oil in a refrigeration compressor crankcase at a desired level.

Another object is to provide an oil level control system for use with a variety of commercial and industrial refrigeration systems including systems having two or more compressors sharing a common refrigerant piping network.

Another object is to provide an oil level control system for multiple compressor refrigeration systems which independently controls the oil level in individual compressors.

Another object is to provide an oil level control system which is relatively inexpensive to make and install on compressors and like devices.

Another object is to maintain a desired oil level in a compressor by means which are relatively unaffected by system conditions such as system pressures and pressure changes.

Another object is to provide means to produce an alarm condition when the fluid level in a system rises above or falls below preestablished levels.

Another object is to reduce the maintenance and adjustment required to maintain a desired oil level in a compressor.

Another object is to provide oil level monitoring and controlling means that can be adjusted to be as sensitive as desired.

Another object is to enable use of solenoid valves to feed oil into the crankcases of compressors as needed to maintain a desired oil level.

These and other objects and advantages of the present invention will become apparent after considering the following detailed specification of preferred embodiments in conjunction with the accompanying drawings.

DETAILED DESCRIPTION OF THE PREFERRED EMBODIMENT

Figure 1:
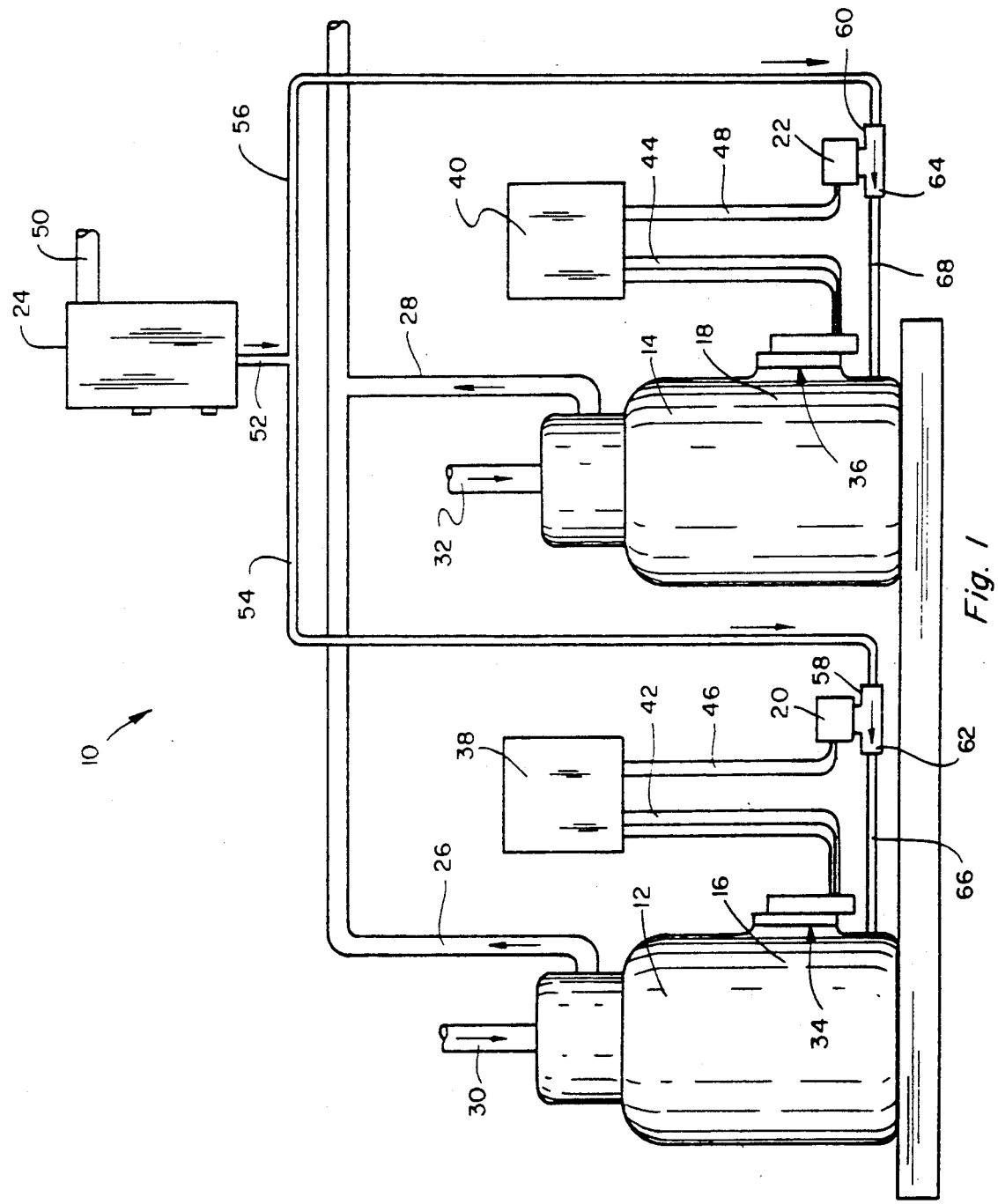
FIG. 1 is a side elevational view showing schematically a system which includes two or more compressors and oil level control means constructed according to the present invention.

Referring to the drawings more particularly by reference numbers wherein like numerals refer to like parts, FIG. 1 discloses a multiple compressor system 10 having oil level control means embodying the teachings of the present invention. The system 10 is shown including two refrigerant compressors 12 and 14. The compressors 12 and 14 include crankcases 16 and 18 respectively on which are mounted means for sensing the level of oil therein, and when required produces an output that can be used to control valve means such as solenoid valve means 20 and 22 to feed oil into the compressors 12 and 14 respectively. The compressors 12 and 14 can share oil from a common source 24 if desired. While FIG. 1 illustrates a system having two compressors, it is understood that any number of compressors each controlled by its own oil level sensor can be included.

The system 10 shown in FIG. 1 has output conduits 26 and 28 connected to the respective compressors 12 and 14 and return conduits 30 and 32 respectively to each of the compressors. The compressors also have sensor means 34 and 36 mounted on the respective crankcases 16 and 18 as will be described and the sensors 34 and 36 are connected to respective electric control panels 38 and 40 by leads 42 and 44 respectively. The controls 38 and 40 also have other electrical connections 46 and 48 which are connected to the respective solenoid valves 20 and 22. The oil accumulation vessel 24 receives oil from a source through conduit 50. An outlet conduit 52 communicates vessel 24 with respective conduits 54 and 56 which have their opposite ends connected to the inlet sides 58 and 60 of the solenoid valves 20 and 22. The outlet sides 62 and 64 of the solenoid valves 20 and 22 are connected by conduits 66 and 68 to the respective crankcases 16 and 18. This means that whenever the solenoid valves 20 and/or 22 are energized as will be described, oil will be delivered from the source 50 into the respective crankcase to increase the oil level therein.

Of special importance to the present invention is the construction and operation of the sensor means 34 and 36 and the circuit means associated therewith. Several different embodiments of the sensors will be described as will several different embodiments of the circuitry associated therewith. The embodiment that is selected will depend upon the kind of information required, the adjustability of the oil level, and whether or not it is desired to produce alarm conditions such as a noise or flashing light when the oil level in a particular compressor rises above some predetermined level or falls below some other predetermined level.

Figure 2:
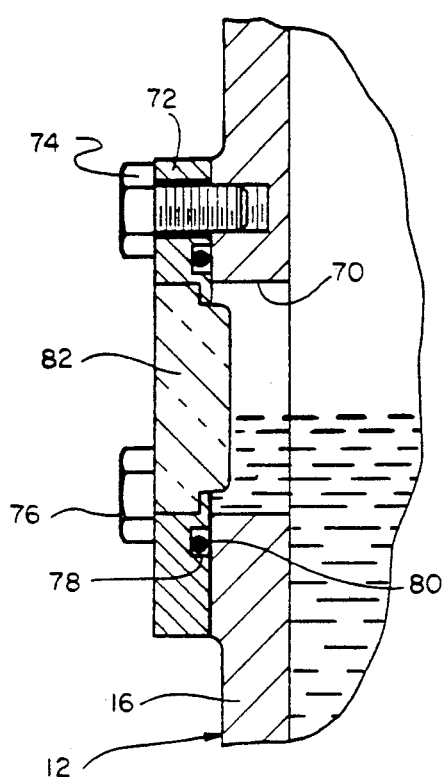
FIG. 2 is a fragmentary side elevational view in cross-section of a portion of the crankcase housing of a compressor having a window closed by a member including a prism member.
Figure 4:
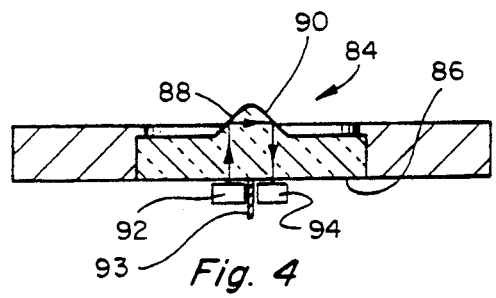
FIG. 4 is a cross-sectional view taken on line 4—4 of FIG. 3.

FIG. 2 shows a portion of the crankcase 16 of the compressor 12. The crankcase 16 has an opening or window 70 formed therein, and the window 70 is closed by a housing member 72 which has provisions such as threaded members 74 and 76 for attaching it to the crankcase 16. The closure member 72 is also shown having a channel 78 for receiving an O-ring 80 which forms a seal between the crankcase and the member 72. The member 72 also has an opening in which is sealably mounted a prism member or sight glass 82 which is part of an optical coupler assembly 84 (FIG. 4). The prism as shown in FIG. 4 has a flat outer surface 86 and two angularly oriented surfaces 88 and 90 formed on the inner surface, the surface which is exposed to the inside of crankcase 16 so as to be in contact with the crankcase oil. The surfaces 88 and 90 are positioned to be oriented vertically and are also oriented at 90° to each other. One or both of the surfaces 88 and 90 can also be entirely or partially covered with a layer of material to reduce their exposure to the oil in the crankcase.

Mounted opposite from the prism surface 88 is a light source 92 and mounted opposite from the prism surface 90 is a light detector or sensor device 94. The light source 92 is positioned to direct its light through the prism member 82 and at a 45° angle to the surface 88. The surface 88 is oriented to reflect some of the light impinging thereon toward the surface 90 which in turn is oriented to reflect some of the light it receives toward the light detector or sensor 94. The amount of light from the light source 92 that reaches the detector 94 will depend upon whether the level of oil in the compressor crankcase is above or below the level at which the light from the light source 92 impinges on the surface 88. If the level of oil is below the location on the surface 88 where the light impinges, the light will be reflected to the surface 90 and into the detector 94. If the level of oil is above the level of the detector 94, little or no light will be reflected to the detector 94. This then can be used as a means to make a distinction between an adequate level of oil and a level of oil that is less than adequate and therefore needs to be added to. If the oil level is below the level of the light detector 94, a signal will be produced by the light detector that can be used to energize a solenoid valve to cause oil to be fed into the crankcase until the signal is no longer present. It is also contemplated to provide optical isolation such as shield 93 (FIG. 4) between the light source or sources and the sensor or detector elements to prevent the sensor or detector elements from receiving light directly from the light source or light sources.

Figure 3:
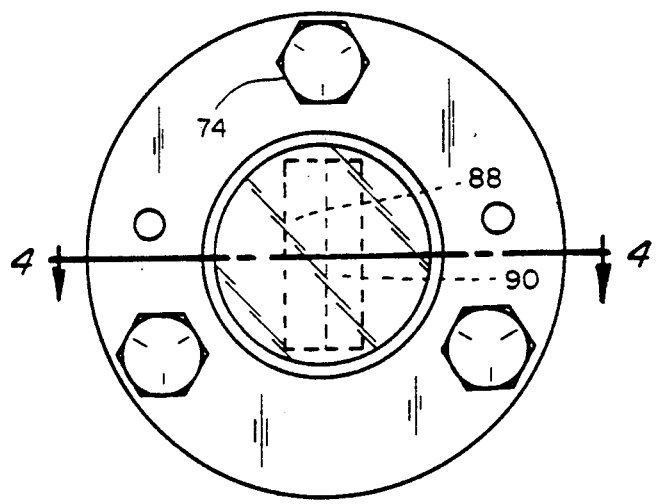
FIG. 3 is a side elevational view as seen from the left in FIG. 2.

FIG. 3 shows the relative orientation of the prism surfaces 88 and 90 as viewed from the left in FIG. 2 and with the light source and light detector being removed.

Figure 5:
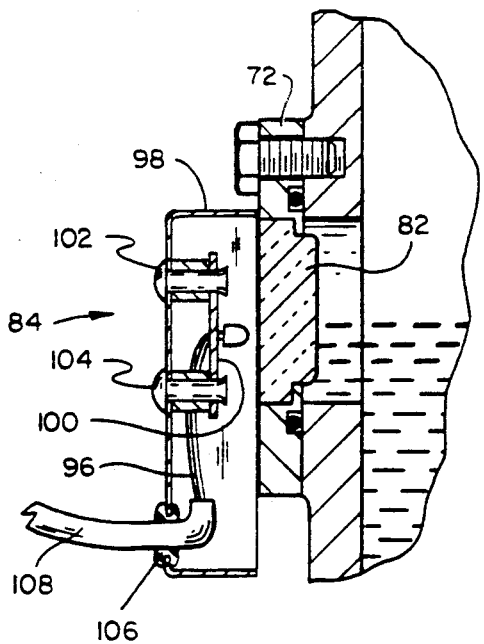
FIG. 5 is a view similar to FIG. 2 but showing an optical coupler device mounted in a housing externally of the prism.

FIG. 5 shows a construction of the optical coupler means 84 mounted in association with the prism 82. In this construction a single optical coupler 84 is provided and the connections for the light source 92 and the sensor 94 are shown included in leads 96 which are connected remotely to a circuit which will be described later. In FIG. 5 it can be seen that the optical coupler 84 is mounted in a housing 98 which is attached to the member 72 by suitable means. The light source and sensor or detector elements are mounted on a wall member 100 which is supported on the wall of the housing 98 by rivets 102 and 104 or other suitable means. A grommet 106 is also provided for the passage of the leads 96 and surrounding sheath 108 in which they are located.

Figure 6:
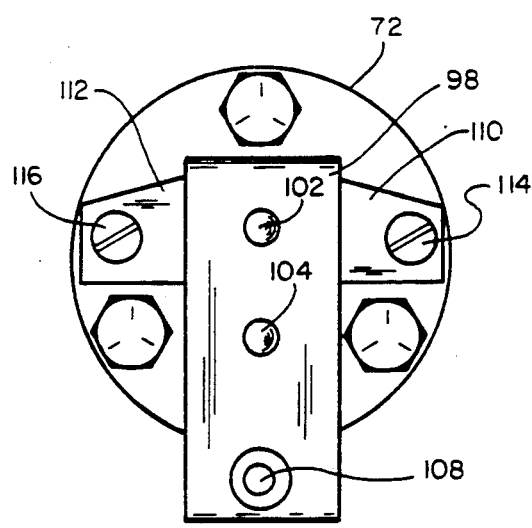
FIG. 6 is a side view seen from the left in FIG. 5.

FIG. 6 is a left view of the construction shown in FIG. 5 showing the location of the elements therein. Note that the housing member 98 has side flanges 110 and 112 which are connected to the member 72 by means of threaded members 114 and 116.

Figure 7:
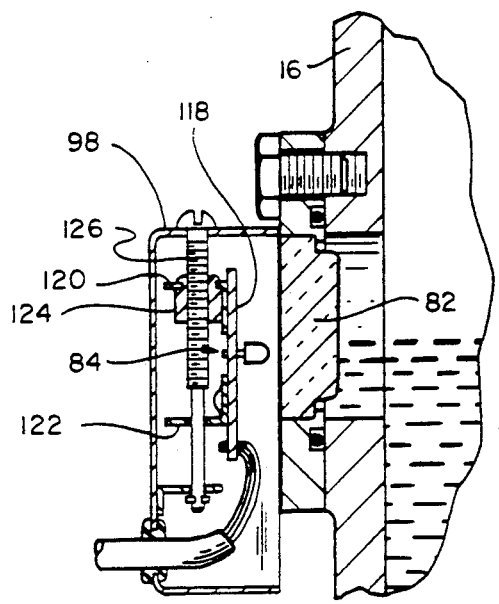
FIG. 7 is a cross-sectional view similar to FIG. 5 but showing adjustable means for mounting the optical coupler.
Figure 8:
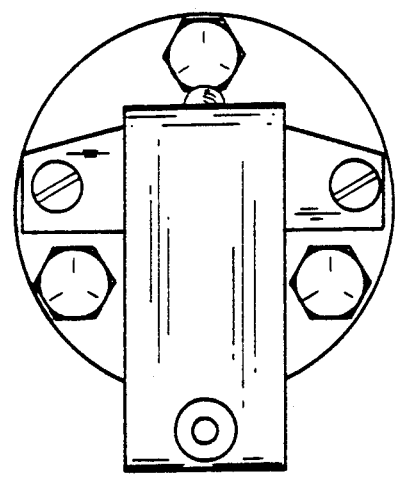
FIG. 8 is a side view as seen from the left in FIG. 7.

FIG. 7 is similar in most respects to FIG. 5 but differs therefrom in that the wall member 100 is replaced by wall member 118 which is mounted on flanges 120 and 122 one of which has a threaded member 124 mounted thereon as shown. A threaded member or screw 126 extends downwardly through an opening in the upper wall of the housing member 98 and can be rotated in either direction to cause the optical coupler 84 to be moved vertically in order to establish a desired oil level for the crankcase 16. Except for this feature the construction shown in FIGS. 7 and 8 is similar to the construction shown in FIGS. 5 and 6.

Figure 9:
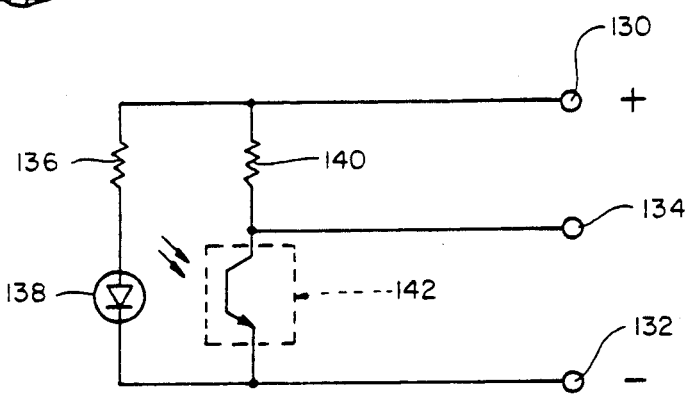
FIG. 9 is a circuit diagram showing the connections for the optical couplers shown in FIGS. 5 and 7.

FIG. 9 is a simplified circuit diagram for the optical couplers 84 shown in FIGS. 5 and 7. The circuit includes a positive voltage terminal 130, a negative voltage terminal 132, and an output terminal 134. A resistor 136 and light source 138 are connected in series across the positive and negative terminals 130 and 132 so that the light source 138 will be energized at all times when the system is operating.

Also connected between the terminals 130 and 132 is another resistor 140 and a light sensor or optical detector 142 which responds to light received from the light source 138 as described above. When sufficient light impinges on the detector 142 the sensor will in effect short circuit, and this will cause a substantial change in the voltage on the output terminal 134. This voltage change can then be used to cause a solenoid valve to be energized to feed oil into the crankcase as will be explained in connection with FIG. 16.

Figure 10:
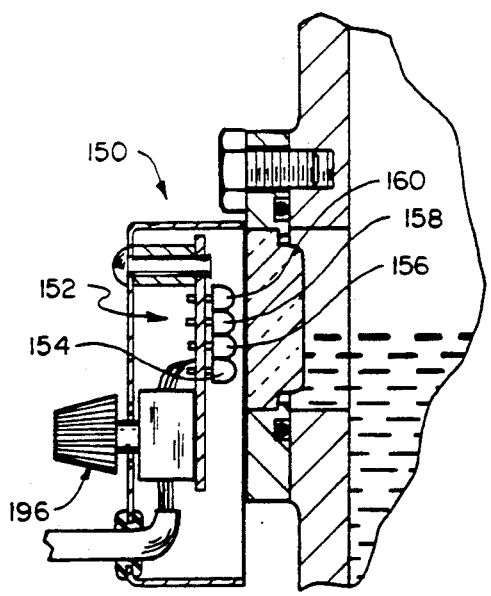
FIG. 10 is a view similar to FIGS. 5 and 7 showing another form of optical coupler means for use in the subject device.
Figure 11:
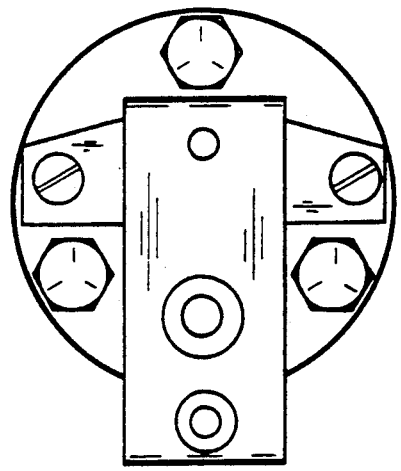
FIG. 11 is a side elevational view as seen from the left in FIG. 10.

FIG. 10 shows another embodiment 150 of the subject device which includes a sensor assembly 152 that has four vertically spaced optical couplers 154, 156, 158, and 160 located adjacent to the external surface of the prism member 82. Each optical coupler 154, 156, 158, and 160 operates similar to the optical couplers 84 described above in connection with FIGS. 5 and 7, and each includes respective light sources 162, 164, 166, and 168 (FIG. 12) and detectors 170, 172, 174, and 176. The light sources 162-168 are connected with resistor 178 across a voltage source, and each of the optical detectors 170-176 is biased by a respective resistor 180, 182, 184 and 186, as shown. In the construction shown in FIGS. 10-12 the output sides of the respective detectors 170-176 are connected to respective terminals 188, 190, 192, and 194 of multiposition switch 196. The switch 196 has a movable contact 198 which can be positioned in engagement with any one of the terminals 188-194 depending on which of the optical couplers is selected to sense the desired oil level to be maintained in the crankcase. Except for the feature of selectivity the individual optical couplers 154-160 are constructed and operate in the same manner described above in connection with the optical couplers of FIGS. 5-7.

Figure 12:
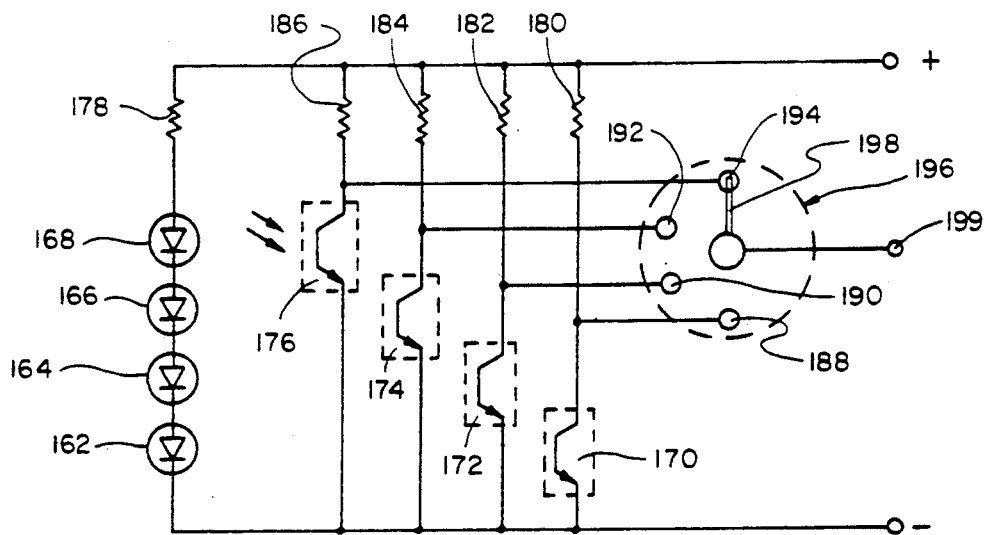
FIG. 12 is a circuit diagram of the optical coupler means shown in FIGS. 10 and 11.
Figure 14:
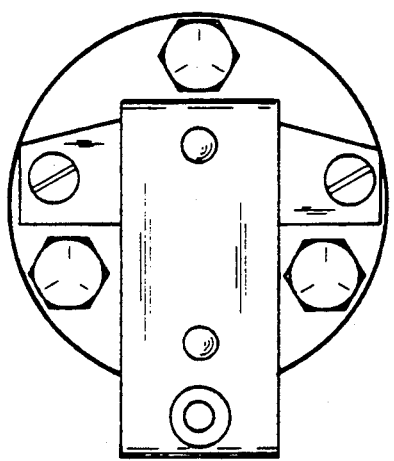
FIG. 14 is an elevational view as seen from the left in FIG. 13.
Figure 13:
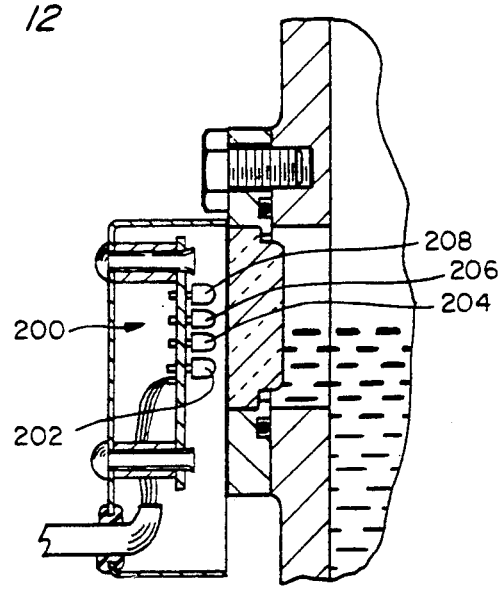
FIG. 13 is a cross-sectional view similar to FIG. 10 but showing another form of optical coupler means.
Figure 15:
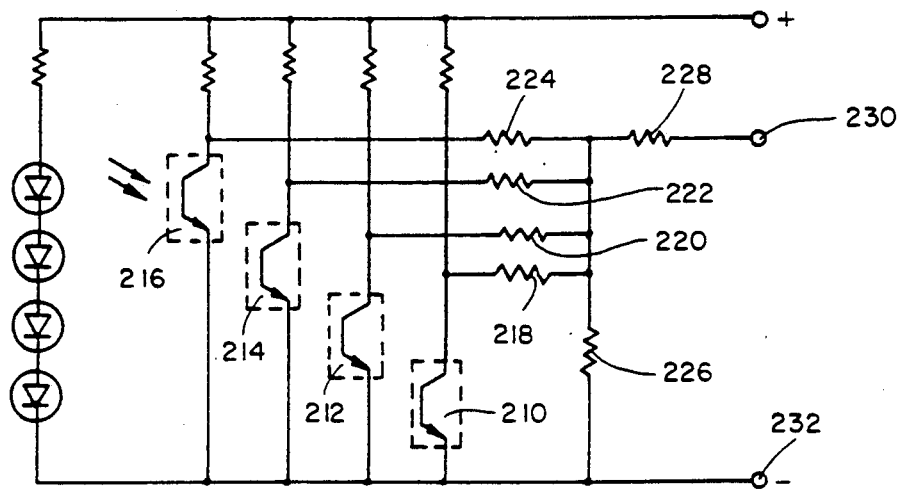
FIG. 15 is a circuit diagram of the optical coupler means shown in FIGS. 13 and 14.

FIGS. 13-15 show another embodiment 200 of the subject device which likewise has four vertically spaced optical couplers 202-208 connected into a circuit somewhat similar to the circuit of FIG. 12. However, instead of having a multiposition switch with separate terminals connected to the output of each optical detector, the circuit of FIG. 15 has the outputs of each of the respective optical detectors 210-216 connected through respective biasing resistors 218-224 to other biasing resistors 226 and 228. The output of the circuit of FIG. 15 appears on terminal 230. With the construction shown in FIG. 15, it is possible to sense various oil levels including oil levels that are above or below the level of all of the optical couplers as well as oil levels that are above or between the various optical couplers as desired. The number of optical couplers that have their optical detectors receiving sufficient light from the associated light sources determines the level or range of oil levels that are present. If all four of the optical detectors are receiving light from their associated light sources, all will be in a conducting condition and each of their respective biasing resistors 218-224 will be effectively connected to the negative side or terminal 232 of the power supply. The opposite side of the detectors 210-216 will be connected through respective resistors 218-224 to the voltage divider circuit formed by the resistors 226 and 228. Under these conditions the magnitude of the output appearing on the output terminal 230 will be at its lowest possible potential. On the other hand, if the oil level is such that less than all of the optical detectors are receiving light of predetermined intensity the magnitude of the output potential on the terminal 230 will be at a somewhat higher potential and the difference can be detected by circuit means and used to perform some function as will be described. The fewer of the optical detectors that are conducting, the higher will be the potential on the terminal 230 and if none of the optical detectors is receiving light, the voltage at the output will be at its highest potential. The different magnitudes of the output voltage can be sensed and used to control circuit means to energize a solenoid valve or operate warning lights or the like, and all of the detectors can be used to establish any desired output analog signal depending on the adjustment of the circuit potentiometers which will be described in connection with FIGS. 16 and 17. While FIGS. 10 and 12 show the use of four light sources and detectors, the number can be increased to obtain closer level control or decreased to any number greater than one.

Figure 16:
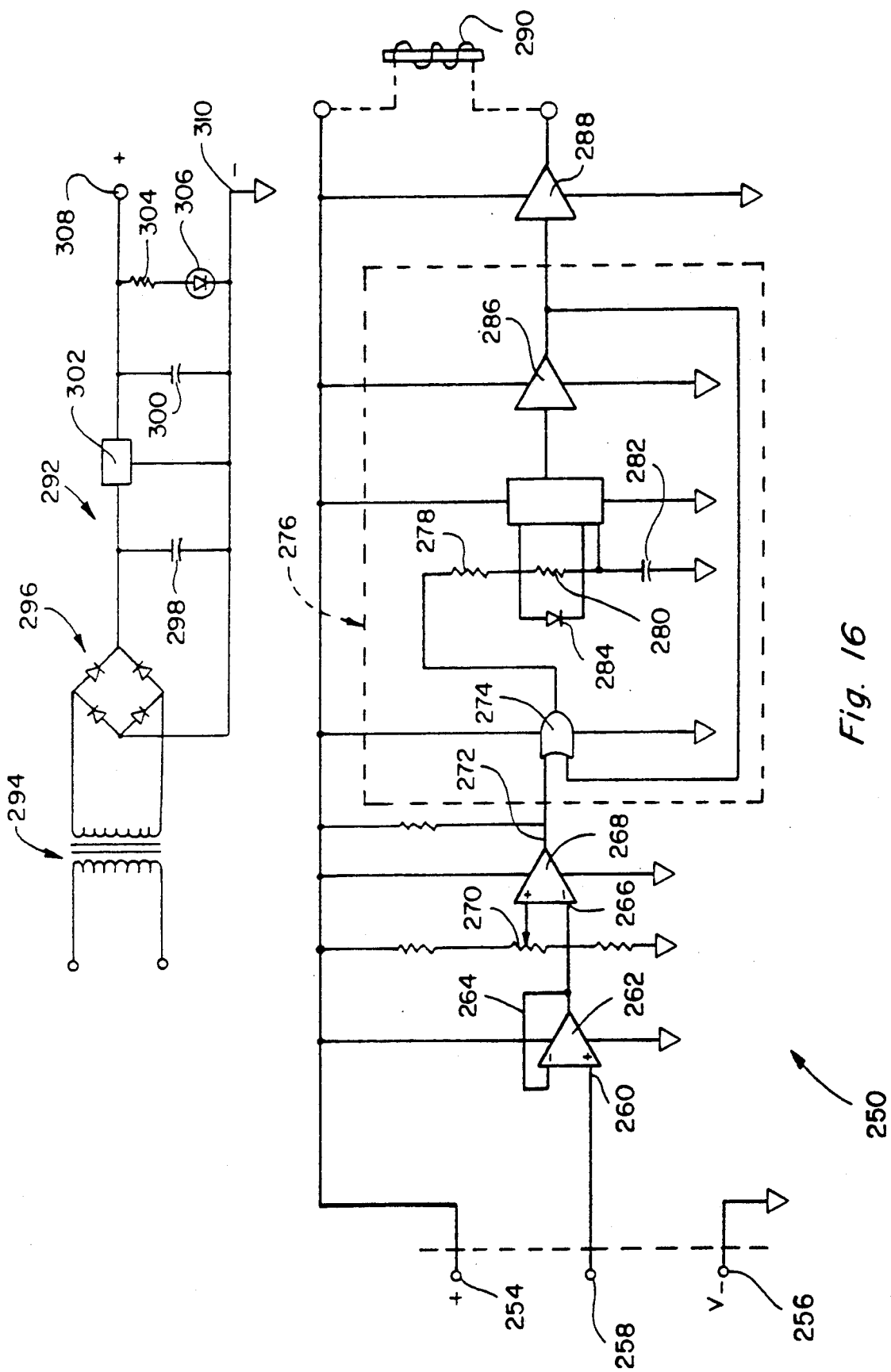
FIG. 16 is a schematic circuit diagram of the circuit for use with the optical coupler means shown in FIGS. 5-15.

FIG. 16 shows a circuit 250 for use with the optical coupler constructions shown FIGS. 5, 7, 10, 12, 13, and 15, and FIG. 17 shows a circuit 252 for use with the construction shown in FIGS. 13-15.

Referring to FIG. 16, the circuit 250 has input terminals 254, 256, and 258. The terminal 254 is labeled + and is connected to the positive potential terminal of the power supply. The terminal 256 is the negative potential input terminal or ground, and the terminal 258 receives the operating outputs of the optical coupler such as the operating outputs on terminals 134 or 199 of the circuits shown in FIGS. 9 and 12.

The input signals to FIG. 16 from the outputs of the optical coupler are applied as one of the two inputs 260 of operational (OP) amplifier 262, which amplifier acts as a high impedance buffer circuit and has its output connected by lead 264 back to the other input thereto. The output of the OP amplifier 262 is also connected to one of two inputs 266 of comparator circuit 268 which operates to compare the input signal appearing on the output of the optical coupler to an arbitrary signal level established on the other input of the comparator 268 by the adjustment of potentiometer 270. The potentiometer can therefore be set to establish any desired oil level. When the comparator 268 provides a suitable output indicating that the optical detector (or detectors) is receiving sufficient light from its associated light source (or sources), an output signal will appear on the output 272 of the comparator circuit 268 and will be applied as one of two inputs to OR gate 274. The OR gate 274 is suitably connected into and is part of an optional timing circuit 276. The timing circuit 276 is provided to cycle (turn on and off) the operation of a solenoid valve 20 (or 22) (FIG. 1) which is provided to cause oil to be added to the crankcase 16 (or 18). The cycling is done to allow time for the dissipation of foam that may accumulate in the crankcase so that the signals produced by the optical couplers will accurately indicate the true oil level. The outputs of the OR gate 274 are applied as inputs to the timer circuit 276 suitably biased to establish a desired operating or cycling condition by resistors 278 and 280, capacitor 282 and diode 284 connected as shown. The output of the timer circuit 276 includes an inverter circuit 286 which, by connection of its output to OR gate 274, is a latch type circuit, the output of which is connected to driver circuit 288 which has its output in turn connected to one side of solenoid coil 290 of the solenoid valve 20 (or 22). The latch circuit is constructed to hold for a minimum on cycle. When the solenoid coil 290 is energized, the respective solenoid valve 20 (or 22) will open to admit oil from the oil source 50 into the crankcase 16 or 18 until the desired oil level is reached as indicated by the optical coupler. The timer circuit 276 will operate to energize and deenergize the solenoid coil 290 at some desired frequency as long as the optical coupler means indicates that the solenoid valve should be energized. This is done so that any foaming that occurs in the crankcase will dissipate before a reading is taken to determine if more oil should be added and therefore will not effect the accuracy of the optical coupler means.

The circuit 250 described in connection with FIG. 16 also includes a power supply circuit 292 shown having a transformer 294, a rectifier circuit 296, and a filter circuit formed by capacitors 298 and 300, a voltage regulator element 302, a resistor 304 and light emitting diode 306 connected in series across the circuit as shown. The positive and negative output terminals 308 and 310 of the power supply are connected to the circuit inputs described above.

Figure 17:
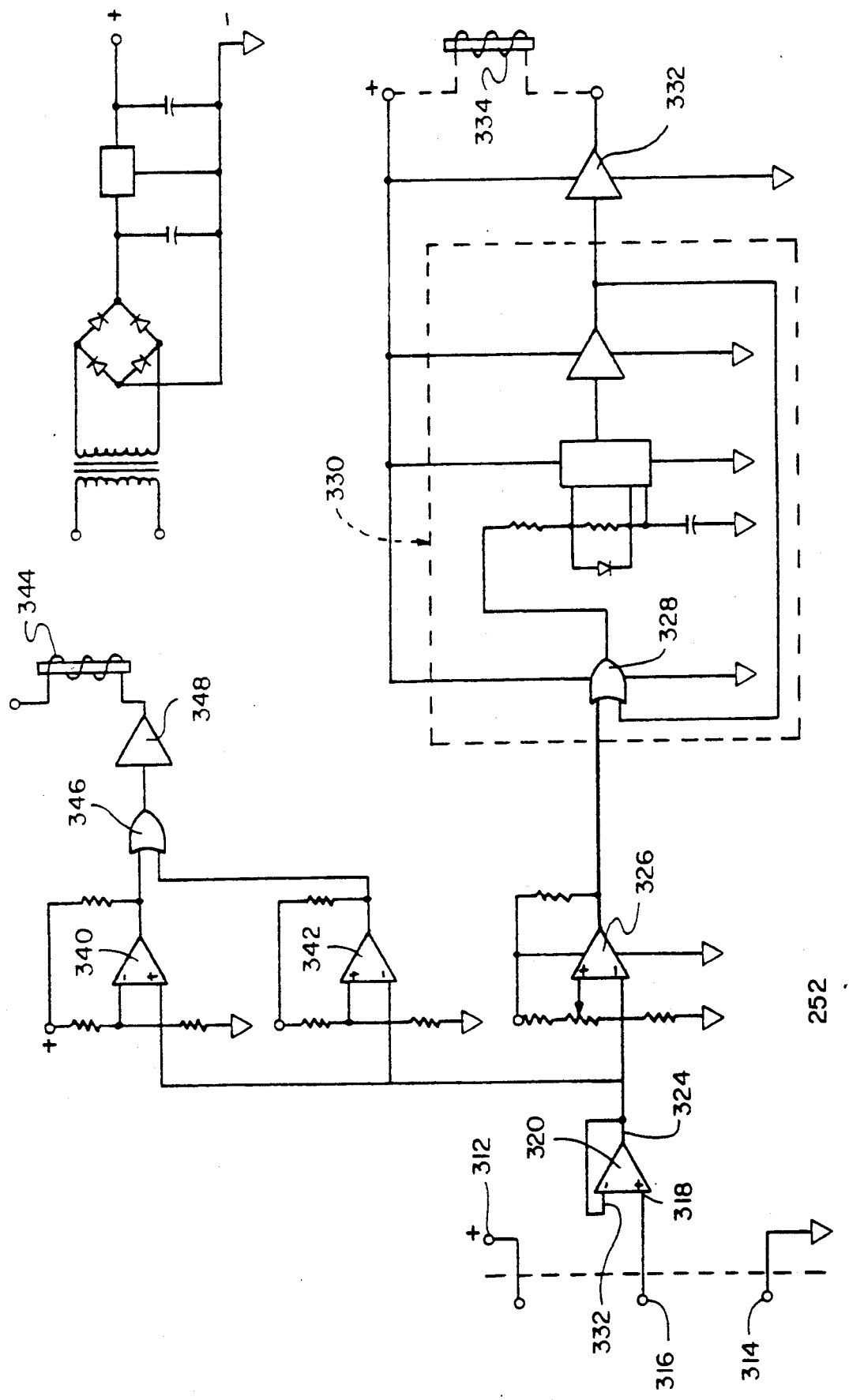
FIG. 17 is a schematic circuit diagram for the system employing the optical coupler means shown in FIGS. 13-15.

FIG. 17 has certain features which are similar to FIG. 16, but it also has features which enable it to be operated in conjunction with the optical coupler construction shown in FIG. 15, which construction produces various voltage levels depending upon the number of photo detectors or transducers 210-216 that are receiving light from light sources by way of the reflective surfaces on the prism member. The circuit 252 of FIG. 17 includes a positive voltage input terminal 312, a negative voltage input terminal 314, and an active input terminal 316 which is connected to the output terminal 230 of the circuit shown in FIG. 15. The input signals to the circuit of FIG. 17 are connected to one input 318 of OP amplifier 320 which has its output connected back to the second input 322 thereof. The output 324 of the OP amp 320 is also connected to the inputs of other circuits including comparator circuit 326 suitably biased as shown. The outputs of the comparator circuit 326 are connected to and through OR gate 328 which is part of a timer circuit 330 to a driver circuit 332 which has its output connected to one side of solenoid coil 334 of a solenoid valve. The solenoid coil 334 is energized whenever the output of the OP amplifier 320 is above some predetermined voltage and is cycled by the timer circuit 330 as described above in connection with FIG. 16 to overcome the foam problem.

The output of the OP amplifier 320 is also connected to the positive and negative inputs of other comparator circuits 340-342 which are provided to control the energizing of an alarm coil 344. The comparator circuit 340 produces an alarm signal whenever the oil level in the compressor crankcase exceeds some predetermined level and the comparator circuit 342 produces a similar alarm signal whenever the oil level in the compressor crankcase falls below some other predetermined minimum oil level. Both oil level conditions may be established by the settings of the circuit potentiometers. Except for the fact that one of the comparator circuit 340 is biased to respond to oil levels greater than a predetermined level and the comparator circuit 342 is biased to respond to oil levels that are less than a predetermined level the circuits 340 and 342 operate similarly and both produce the desired alarm condition.

The outputs of the comparators 340 and 342 are connected to the inputs of OR gate 346 which has its output connected to driver circuit 348, and the output of the driver circuit is connected to the alarm coil 344. The circuits 326, 340 and 342 include associated biasing resistors which are selected to establish their operation conditions. The main difference between the circuit shown in FIG. 17 and the circuit shown in FIG. 16 is that the circuit of FIG. 17 has an alarm producing device or coil 344 which when energized produces an alarm condition such as a display, a warning light, a warning sound or some combination of these. The actual warning condition can be located remote from the compressors being monitored such as on a control panel or the like.

It is apparent that the present oil level control and monitor means provide a very accurate means for maintaining the oil level in the crankcases in one or more compressors, and it does so by means which positively energize or de-energize solenoid valves which are devices that are relatively unaffected by environmental and other conditions which affect more conventional oil level control means such as float valves and the like. The present device also provides means for individually maintaining the oil level in a plurality of compressor crankcases at desired levels and in some embodiments enables adjusting the oil level as desired. The device also provides the possibility of producing an alarm in cases of over-filling and under-filling. There are many conditions which can cause over and under-filling including a defective solenoid valve, a shortage of oil in the oil source or reservoir or separator, defective sensors, foaming conditions and the like.

It is also important in some forms of the present construction to provide timer means for energizing and deenergizing the solenoid valve at some rate or frequency to overcome the foaming problem described above.

Figure 18:
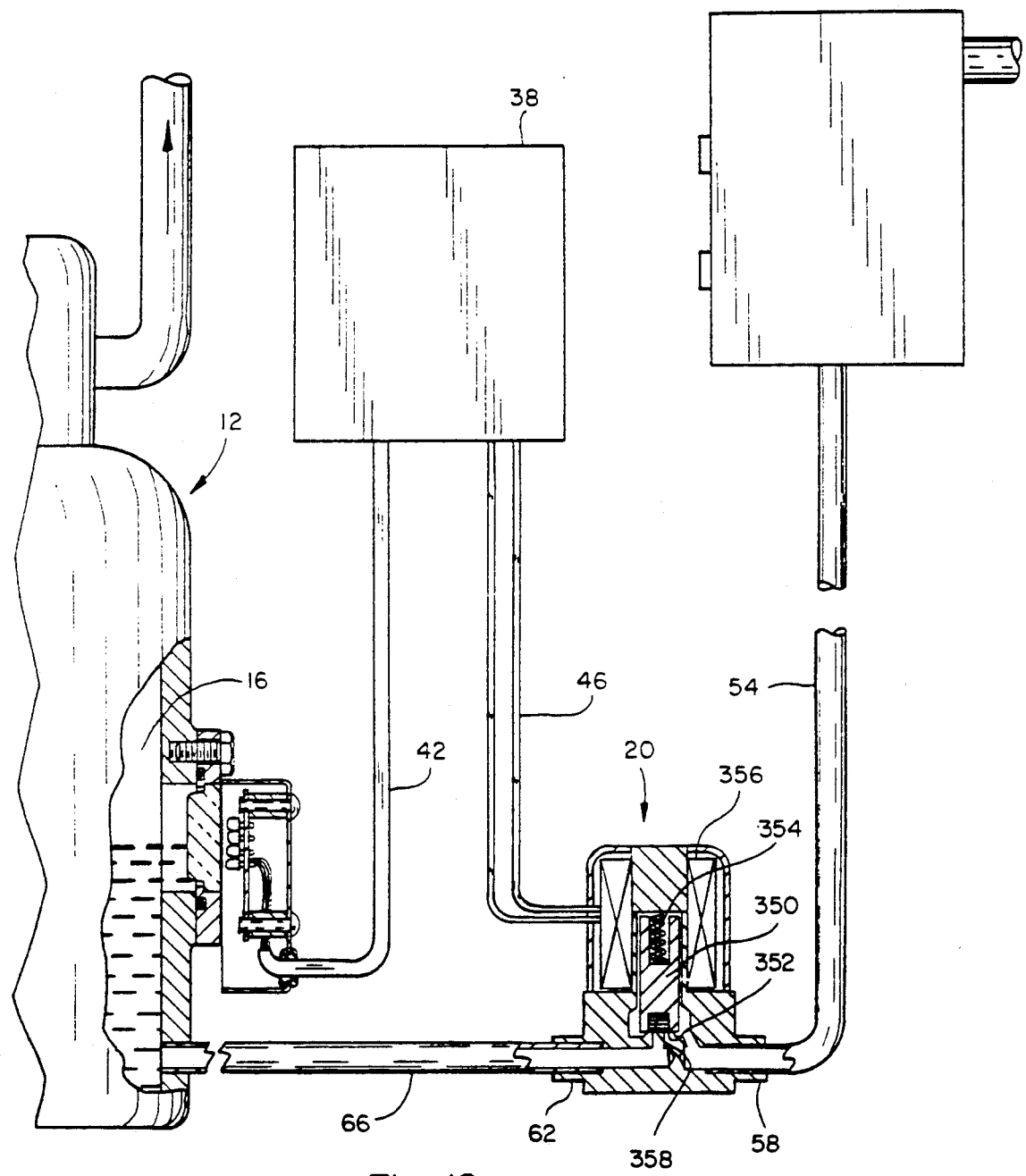
FIG. 18 is an enlarged view showing a portion of the compressor system shown in FIG. 1 and embodying the teachings of the present invention, said view in part being shown in cross-section.

FIG. 18 is a schematic view of the system 10 showing more of the details of the solenoid valve 20 which can be energized by the means described above. The solenoid valve 20 is of the normally closed type permitting oil from conduit 54 to flow into conduit 66 only when the solenoid is energized. The solenoid valve 20 includes valve stem 350, valve seat 352, biasing spring 354 and solenoid coil 356. In the normally closed position the spring 354 maintains the valve stem 350 in positive contact with valve seat 352 so as to prevent the flow of oil through the valve. Valve stem 350 includes a resilient portion 358 which actually contacts the seat 352 and which provides a more positive seal thereagainst. When the coil 356 is energized the stem 350 is positively urged in opposition to the spring 354 opening a passage between stem 350 and seat 352 allowing oil to flow into the crankcase. When the coil 356 is deenergized the force urging the stem 350 against the spring 354 is removed allowing the stem 350 to again positively close.

Thus there has been shown and described several embodiments of oil level control means for use on compressors and especially compressors used in refrigeration and air conditioning systems which fulfill all of the objects and advantages sought therefor. It will be apparent to those skilled in the art, however, that many changes, variations, modifications, and other uses and applications for the subject means are possible; and all such changes, variations, modifications, and other uses and applications which do not depart from the spirit and scope of the invention are deemed to be covered by the invention which is limited only by the claims which follow.

What is claimed is:

1. A level sensor device for sensing the level of oil in the crankcase of a refrigeration compressor comprising an optical prism having angularly related surfaces positioned to be exposed to the crankcase oil whose level is to sensed,
    means mounting the prism with the angularly related surfaces exposed to the crankcase oil,
    a plurality of vertically spaced external light sources each having means for directing light from the source through the prism to a spot on one of the angularly related surfaces whereby at least a portion of the light is reflected by said surface to the other angularly related surface and is reflected back through and from the prism,
    a plurality of vertically spaced external light sensors corresponding in number to the number light sources positioned to be exposed to the light reflected back through the prism from said other angularly related prism surface, the intensity of reflected light decreasing substantially when the level of the liquid being sensed is high enough to cover the prism to the level of selected ones of the light spots produced by the respective light sources, each of said sensors having an output terminal on which a voltage representative of the intensity of the light from the respective light source impinging thereon appears,
    a solenoid valve for controlling communication between a source of oil and the crankcase, and
    circuit means having an input connected to the output terminals of selected ones of the sensors and an output for connection to the solenoid valve.

2. The level sensor device of claim 1 wherein the circuit means includes means for producing an alarm condition of intensity of the light being sensed by the light sensors exceeds some predetermined intensity.

3. The level sensor device of claim 1 wherein the circuit means includes means for producing an alarm condition if intensity of the light being sensed by the light sensors is less than some predetermined intensity.

4. The level sensor device of claim 1 including an upper most and lower most light source and associated light sensor, said circuit means having an input connected to the output terminals of the upper most and lower most light sensors, and means in the circuit to produce a warning when the oil level rises above the level of the uppermost light sensor or falls below the level of the lower most light sensor.

5. The level sensor device of claim 1 wherein the refrigeration compressor includes a housing having an opening therein, conduit means connected between the oil source and the compressor crankcase, and means mounting the prism in the opening in the crankcase housing with the angularly related prism surfaces exposed to the oil inside of the crankcase.

6. The level sensor device of claim 5 including a plurality of compressors each having a crankcase with a housing having an opening therein and a prism mounted in said opening, each compressor crankcase being connected to the source of compressor oil by associated conduit means.

7. Oil level sensor means comprising
    a compressor crankcase for containing some of the oil used by the compressor and means to maintain the level of oil in the crankcase at a predetermined level, the crankcase having a housing with a side wall for confining oil therein,
    a source of oil, conduit means having a solenoid operated valve therein for controlling communication between the source of oil to the crankcase, sensor means mounted in the crankcase housing including a prism member having flat angularly related surfaces including first and second right angularly related surfaces exposed to the environment inside of the crankcase and a third external prism surface, all three of said first, second, and third surfaces being oriented in a substantially vertical orientation on the crankcase housing, a source of light mounted externally of the crankcase in position to direct a beam of light through the prism member from the third surface toward the first surface, some of the light being reflected by said first surface toward the second surface for reflection thereby back through the prism and outwardly from the third surface, more of the light from the light source being reflected by the first and second prism surfaces when the level of the oil in the crankcase is below the location where the light beam impinges on the first prism surface than otherwise, light responsive means having an output connection positioned externally of the crankcase in position to be exposed to the light reflected by the second prism surface back through the prism member, and circuit means having an input connected to the output connection of the light responsive means and an output connected to the solenoid valve for energizing the solenoid valve whenever the level of oil in the crankcase is below the level where the beam of light impinges on the first prism surface.

8. The oil level sensor means of claim 7 wherein the circuit means includes adjustment means to establish the level of the output in the output connection of the light responsive means that is sufficient to energize the solenoid valve.

9. The oil level sensor means of claim 8 wherein the adjustment means includes a potentiometer.

10. In a system for compressing substances including at least two compressors each having a housing with a compression chamber for compression means and a crankcase having a crankcase housing where lubricant used in the compression process accumulates, the improvement comprising lubricant level sensing means mounted in the crankcase housing of at least one compressor, a source of lubricant including conduit means and solenoid valve means under control of the level sensing means for feeding lubricant to selected ones of the compressors when the lubricant level in the crankcase falls below a predetermined lubricant level as sensed by the respective lubricant level sensing means, said lubricant level sensing means including a glass prism having a flat surface on one side located outside of the crankcase and two flat surfaces oriented at right angles to each other vertically oriented on the opposite side of prism and located to be exposed to the lubricant in the crankcase housing in the region of the desired lubricant level, circuit means operatively connected to the lubricant level sensing means for producing a first output condition when the level of lubricant in the crankcase housing is below the lubricant level sensing means and a second output condition when the level of lubricant in the crankcase housing is above the level of the level sensing means, said solenoid valve means having energizable means connected to the output of the circuit means to be energized to admit lubricant into the crankcase housing from the source whenever the output of the circuit means is in the first output condition.

11. In the system of claim 10, wherein the circuit means includes means adjustable to establish a predetermined voltage condition for the first output condition that is sufficient to energize the valve means.

12. Means to maintain a predetermined oil level in the crankcase of a refrigeration compressor comprising a compressor having compression means, a crankcase having a crankcase housing where oil used by the compressor accumulates, a source of oil, and oil level detection means mounted on the crankcase housing, said oil level detection means including a prism having first and second right angularly oriented surfaces and a third surface oriented at 45° to the first and second prism surfaces, means for mounting the prism on the crankcase housing in position with the first, second and third prism surfaces substantially vertically oriented and with the first and second prism surfaces exposed to the oil in the crankcase, at least two spaced optical couplers mounted adjacent to the third prism surface, each including a light source having means associated therewith for directing light therefrom at the first prism surface and a light detector positioned to respond to light from the associated light source reflected from the second prism surface, each light detector having an output connection, circuit means having input means connected to the output connection of selected ones of the light detectors, said circuit means including means adjustable to establish a predetermined voltage potential representative of the outputs of the light detectors and of a desired level for the crankcase oil and a circuit output, and solenoid valve means connected between the source of oil and the crankcase, said solenoid valve means having a connection to the output of the circuit means to be energized to feed oil to the crankcase whenever the voltage potential established by the means adjustable in the circuit means exceeds the predetermined voltage level.

13. The means of claim 12 including shielding means to substantially optically isolate the light from the respective light sources from directly reaching the associated light detectors.

14. The means of claim 12 including means attached to a portion of at least one of the first and second prism surfaces to reduce the exposure thereof to the oil in the crankcase.

15. A level sensor for observing liquid levels over a predetermined range of levels in a container having a sidewall comprising:

a glass prism having parallel first, second and third angularly related flat surfaces for mounting in the sidewall, means mounting the prism with the first, second and third flat surfaces all vertically oriented, said first surface being oriented at 45° to the second and third surfaces, the second and third surfaces being exposed to the liquid in the container whose level is to be sensed and the first surface being located externally of the container, at least two vertically spaced optical couplers mounted adjacent to the first surface externally of the container, each optical coupler having a light source positioned to direct light produced thereby at the first surface and through the prism against the second surface so that some light is reflected by the second surface to the third surface and back to and through the first surface, each optical couplers also including a sensor positioned externally of the container to be exposed to the light reflected back through the first surface from each of the associated light sources, the amount of light received by the respective sensors depending on the level of the liquid relative to the respective optical couplers, more light being received by a sensor when the level of liquid is below the level of the respective optical coupler, and circuit means connected to selected ones of the sensors for producing output responses that are proportional to the light received by the respective sensors.

16. The level sensor of claim 15 wherein said circuit means includes means for producing an alarm condition when the liquid level being sensed is above a first circuit setpoint and when the liquid level is below a second circuit setpoint.

17. A level sensor device for sensing the level of oil in the crankcase of a refrigeration compressor comprising an optical prism having angularly related surfaces positioned to be exposed to the crankcase oil whose level is to be sensed, means mounting the prism with the angularly related surfaces exposed to the crankcase oil, a light source and means for directing light from the source through the prism to a spot on one of the angularly related surfaces whereby at least a portion of the light is reflected by said surface to the other angularly related surface and is reflected back through and from the prism, a light sensor positioned to be exposed to the light reflected back through the prism from said other angularly related prism surface, the intensity of reflected light decreasing substantially when the level of the liquid being sensed is high enough to cover the prism to the level of the light spot produced by the light source, said sensor having an output terminal on which a voltage representative of the intensity of the light impinging thereon appears, circuit means having an input connected to the output terminal of the sensor and an output for connection to an operation member, and means to adjust the position of the light source relative and the prism.

18. Oil level sensor means comprising a compressor crankcase for containing some of the oil used by the compressor and means to maintain the level of oil in the crankcase at a predetermined level, the crankcase having a housing with a side wall for confining oil therein, a source of oil, conduit means having a solenoid operated valve therein for controlling communication between the source of oil and the crankcase, sensor means mounted in the crankcase housing including a prism member having flat angularly related surfaces including first and second right angularly related surfaces exposed to the environment inside of the crankcase and a third external prism surface, all three of said first, second, and third surfaces being oriented in a substantially vertical orientation on the crankcase housing, a source of light mounted externally of the crankcase including a plurality of vertically spaced light sources for directing respective beams of light through the prism member from different respective elevations of the third surface towards the first prism surface, some of the light being reflected by said first surface toward the second surface for reflection thereby back through the prism and outwardly from the third surface, more of the light from the respective light sources being reflected by the first and second prism surfaces when the level of the oil in the crankcase is below the location where the respective light beams impinge on the first prism surface than otherwise, light responsive means associated with each light source in position to be exposed to the light reflected by the second prism surface back through the prism member, each having an output connection, circuit means having an input connected to the output connection of each of the light responsive means and an output connected to the solenoid valve for energizing the solenoid valve whenever the level of oil in the crankcase is below some predetermined level, the circuit means including means adjustable to establish a desired oil level in the crankcase based on the responses produced by at least two of the light responsive means.

19. The oil level sensor means of claim 18 including an uppermost light source and associated light responsive means and a lowermost light source and associated light responsive means, first circuit means connected to the light responsive means associated with the upper and lower light sources for establishing the upper limit of the oil level in the crankcase, and second circuit means connected to the light responsive means associated with the upper and lower light sources for establishing the lowermost oil level in the container.

20. The oil level sensor means of claim 19 including an alarm device connected to the first and second circuit means for producing an alarm condition whenever the level of oil in the crankcase rises above or falls below the upper and lower established oil level limits.

21. Oil level sensor means comprising a compressor crankcase for containing some of the oil used by the compressor and means to maintain the level of oil in the crankcase at a predetermined level, the crankcase having a housing with a side wall for confining oil therein, a source of oil and conduit means having a solenoid operated valve therein for controlling communication between the source of oil and the crankcase, sensor means mounted in the crankcase housing including a prism member having flat angularly related surfaces including first and second right angularly related surfaces exposed to the environment inside of the crankcase and a third external prism surface, all three of said first, second, and third surfaces being oriented in a substantially vertical orientation on the crankcase housing, a source of light mounted externally of the crankcase in position to direct a beam of light through the prism member from the third surface toward the first surface, some of the light being reflected by said first surface toward the second surface for reflection thereby back through the prism and outwardly from the third surface, more of the light from the light source being reflected by the first and second prism surfaces when the level of the oil in the crankcase is below the location where the light beam impinges on the first prism surface than otherwise, light responsive means having an output connection position externally of he crankcase in position to be exposed to the light reflected by the second prism surface back through the prism member, circuit means having an input connected to the output connection of the light responsive means and an output connected to the solenoid valve for energizing the solenoid valve whenever the level of oil in the crankcase is below the level where the beam of light impinges on the first prism surface, and means for adjusting the vertical position of the source of light and of the light responsive member relative to the prism.

22. Oil level sensor means comprising a compressor crankcase for containing some of the oil used by the compressor and means to maintain the level of oil in the crankcase at a predetermined level. the crankcase having a housing with a side wall for confining oil therein, a source of oil and conduit means having a solenoid operated valve therein for controlling communication between the source of oil and the crankcase, sensor means mounted in the crankcase housing including a prism member having flat angularly related surfaces including first and second right angularly related surfaces exposed to the environment inside of the crankcase and a third external prism surface, all three of said first, second, and third surfaces being oriented in a substantially vertical orientation on the crankcase housing, a source of light mounted externally of the crankcase in position to direct a beam of light through the prism member from the third surface toward the first surface. some of the light being reflected by said first surface toward the second surface for reflection thereby back through the prism and outwardly from the third surface, more of the light from the light source being reflected by the first and second prism surfaces when the level of the oil in the crankcase is below the location where the light beam impinges on the first prism surface than otherwise.

light responsive means having an output connection positioned externally of the crankcase in position to be exposed to the light reflected by the second prism surface back through the prism member, circuit means having an input connected to the output connection of the light responsive means and an output connected to the solenoid valve for energizing the solenoid valve whenever the level of oil in the crankcase is below the level where the beam of light impinges on the first prism surface, the light source including a plurality of vertically spaced light sources for directing beams of light at different respective elevations of the third and first prism surfaces, a light responsive means associated each of said light source in position to be exposed to the light reflected by the second prism surface back through the prism member, the circuit means including means adjustable to establish a desired oil level in the crankcase based on the responses produced by at least two of the light responsive means, and the circuit means including a timer circuit between the output connection of the light responsive means and the solenoid valve, said timer circuit operating to cycle the energizing of the solenoid valve whenever the level of oil in the crankcase is below the level where the beam of light impinges on the first prism surface.

23. The oil level sensor means of claim 22 wherein the timer circuit includes means to establish minimum length duration off time periods.

24. The oil level sensor means of claim 22 wherein the timer circuit includes means to establish minimum length duration on time periods.

25. In a system for compressing substances including at least two compressors each having a housing with a compression chamber for compression means and a crankcase having a crankcase housing where lubricant used in the compression process accumulates, the improvement comprising lubricant level sensing means mounted in the crankcase housing, a source of lubricant including conduit means and valve means under control of the level sensing means for feeding lubricant to the selected ones of the compressors when the lubricant level in the crankcase falls below a predetermined lubricant level as sensed by the respective lubricant level sensing means, said lubricant level sensing means including a glass prism having a flat surface on one side located outside of the crankcase and two flat surfaces oriented at right angles to each other vertically oriented on the opposite side of prism and located to be exposed to the lubricant in the crankcase housing in the region of the desired lubricant level, circuit means operatively connected to the lubricant level sensing means for producing a first output condition when the level of lubricant in the crankcase housing is below the lubricant level sensing means and a second output condition when the level of lubricant in the crankcase housing is above the level of the level sensing means, said valve means having energizable means connected to the output of the circuit means to be energized to admit lubricant into the crankcase housing from the source whenever the output of the circuit means is in the first output condition, the circuit means including means adjustable to establish a predetermined voltage condition for the first output condition that is sufficient to energize the valve means, the circuit means also including a timer circuit to cycle the valve means when the circuit means is in the first output condition.

26. Means to maintain a predetermined oil level in the crankcase of a refrigeration compressor comprising a compressor having compression means, a crankcase having a crankcase housing where oil used by the compressor accumulates, a source of oil, and oil level detection means mounted on the crankcase housing, said oil level detection means including a prism having first and second right angularly oriented surfaces and a third surface oriented at 45° to the first and second prism surfaces, means for mounting the prism on the crankcase housing in position with the first, second and third prism surfaces substantially vertically oriented and with the first and second prism surfaces exposed to the oil in the crankcase, at least two spaced optical couplers mounted adjacent to the third prism surface, each including a light source having means associated therewith for directing light therefrom at the first prism surface and a light detector positioned to respond to light from the associated light source reflected from the second prism surface, each light detector having an output connection, circuit means having input means connected to the output connection of selected ones of the light detectors, said circuit means including means adjustable to establish a predetermined voltage potential representative of the outputs of the light detectors and of a desired level for the crankcase oil and a circuit output, solenoid valve means connected between the source of oil and the crankcase, said solenoid valve means having a connection to the output of the circuit means to be energized to permit feeding oil to the crankcase whenever the voltage potential established by the means adjustable in the circuit means exceeds the predetermined voltage potential, and the circuit means including timer means operable whenever the voltage established by the means adjustable in the circuit means exceeds said predetermined established voltage potential to alternately energize and deenergize the solenoid valve means.

27. The means of claim 26 wherein the timer means deenergizes the solenoid valve means for long enough time periods to establish a condition in the crankcase that eliminates foam that may be present on the oil in the crankcase to enable the detector means to be able to sense light from the associated light sources without foam being present on the oil.

28. The means of claim 26 wherein the timer means includes means to energize the solenoid valve for predetermined minimum length time periods.

* * * * *